UNITED STATES PATENT OFFICE.

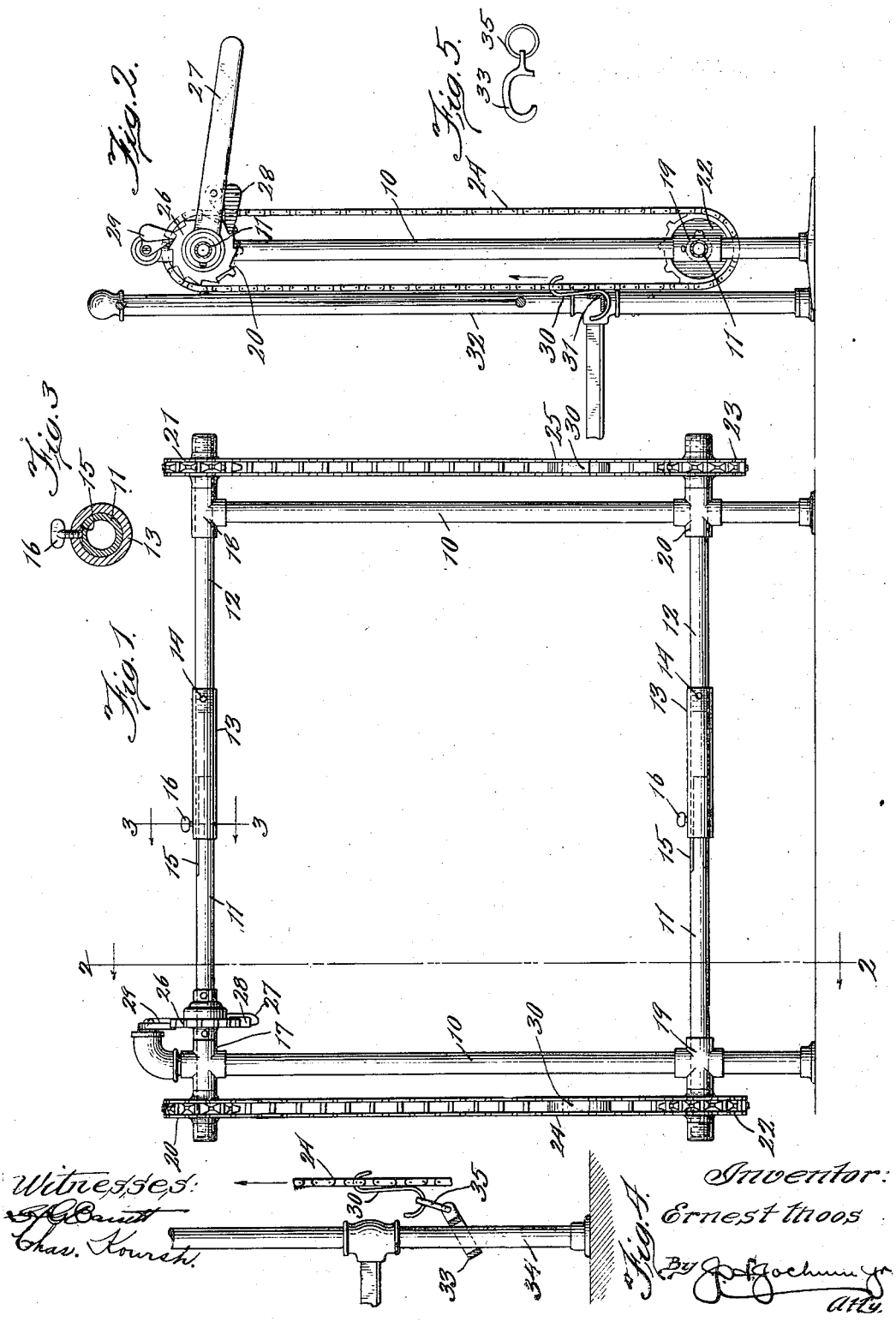

ERNEST MOOS, OF PEORIA, ILLINOIS, ASSIGNOR TO HARRY V. JONES, OF CHICAGO, ILLINOIS.

BED-ELEVATOR.

1,185,699.   Specification of Letters Patent.   Patented June 6, 1916.

Application filed April 17, 1915.   Serial No. 22,067.

*To all whom it may concern:*

Be it known that I, ERNEST MOOS, a citizen of the United States, residing at Peoria, in the county of Peoria and State of Illinois, have invented certain new and useful Improvements in Bed-Elevators, of which the following is a specification.

This invention relates to improvements in bed elevators, particularly adapted, though not necessarily limited in its use for elevating the head or foot of hospital beds, as the occasion may require, and one of the objects of the invention is to provide an improved device of this character, which will be simple, durable and cheap in construction, and effective and efficient in operation.

To the attainment of these ends and the accomplishment of the other new and useful objects, as will appear, the invention consists in the features of novelty in substantially the construction, combination and arrangement of the several parts hereinafter more fully described and claimed and shown in the accompanying drawing illustrating the invention, and in which—

Figure 1 is a front elevation of an improved device of this character, constructed in accordance with the principles of this invention. Fig. 2 is a vertical sectional view taken on line 2—2, Fig. 1. Fig. 3 is a detail sectional view taken on line 3—3, Fig. 1. Fig. 4 is a detail view of a modified form of attachment. Fig. 5 is a detail view of the catch shown in Fig. 4. Referring more particularly to the drawing, the supporting structure embodies uprights 10 which may be constructed of any desired size and material and are of any desired height. Extending transversely of these uprights are cross members, which if desired, and in order that the width of the structure, may be varied, may be comprised of two sections, 11, 12 which are adjustably connected together in any suitable manner, such as by means of a sleeve 13, which is secured in any suitable manner such as by means of a fastening 14 with the element 12, to extend beyond the inner extremity of the latter, and the extremity of the elements 11, may be flattened as at 15 and against which flattened portion a set screw 16 which passes through the element 13, is adapted to engage, for securing the parts 11 and 12 together. The cross bars thus formed preferably constitute axles, which are journaled respectively in bearings 17, 18, 19 and 20, and in which bearings the cross bars are adapted to rotate. Connected with the upper cross bar and preferably arranged on the outside of the supporting structure are sprocket wheels 20, 21, while similar sprocket wheels 22, 23 are connected with the lower cross bar and are arranged respectively in alinement with the sprockets 20, 21. Sprocket chains 24, 25 pass over the respective sprocket wheels so that when the sprocket wheels are rotated, the sprocket chains will be given a traveling movement, and the sprocket chains will be held against swinging movement with respect to the supporting structure by the sprocket wheels.

Any suitable means may be provided for rotating the sprocket wheels. A simple and efficient means for accomplishing this purpose, comprises a ratchet wheel 26 which is connected with one of the elements 11 and a handle 27 is also pivotally mounted upon the element 11 and to which handle is pivotally connected a gravity dog 28, which coöperates with the ratchet wheel 26 so that when the handle 27 is operated, the dog 28 will engage the teeth of the ratchet wheel 26 to rotate the latter and consequently, the element 11, as well as all of the sprockets.

A retaining dog 29 is also provided and is mounted upon a suitable support to coöperate with the ratchet wheel 26 for retaining the parts in their adjusted positions.

In use, catches 30 preferably in the form of a double hook are provided and one end of these catches detachably engage in the links of the sprocket chains, while the other portions of the hooks engage under the cross bar 31 of the bed 32. In use, the hooks or catches 30 are first placed under the cross bar 31, after the hooks have been properly positioned and then the operating handle 27 is actuated, so as to impart a traveling motion to the sprocket chains in the direction indicated by the arrow in Fig. 2. This will cause the head or foot of the bed, adjacent which the elevator is arranged, to be elevated to any desired extent, and the retaining dog will hold the bed in its elevated position.

When it is desired to lower the bed, the dogs 29 and 28 are manipulated in a suitable manner.

In the event that the bed is not provided with a cross bar similar to the cross bar 31, another form of catch 33 is provided and this catch is adapted to engage the leg 34 of the bed, and is itself connected with the hooks 30 in any desired or suitable manner such as by means of a link 35, so that when the sprocket chain 24 is actuated in the direction indicated by the arrow in Fig. 4, the catch 33 will tighten itself upon the leg of the bed, and a further operation of the device will elevate the bed to any desired height.

While the preferred form of construction has been herein shown and described, it is to be understood that many changes may be made in the details of construction and in the combination and arrangement of the several parts without departing from the spirit of this invention and while the supporting structure is shown to be adjustable to vary the distance between the sprocket chains 24, 25, to accommodate beds of varying sizes, it is to be understood that this adjustment is not necessary, as the device may be made in varying sizes.

What is claimed as new is:

1. A portable bed elevator adapted to be arranged adjacent one end of a bed, said elevator embodying a supporting structure, a plurality of flexible elevating elements connected therewith, means for maintaining the said elements against swinging movement with respect to the supporting structure, a bed engaging catch adjustably connected with each of the elements and means for imparting motion to the said elevating elements.

2. A portable bed elevator adapted to be arranged adjacent one end of a bed, said elevator embodying a supporting structure, spaced rotatable elements supported by said structure, one above the other, said elements rotatable about horizontal axes, an endless flexible elevating element passing over the first recited elements, and held from swinging movement thereby, a bed engaging catch adjustably connected with said endless element, and actuating means connected with one of said rotatable elements.

3. A portable bed elevator adapted to be placed adjacent one end of a bed, said elevator embodying a supporting structure, spaced rotatable elements supported by said structure, one above the other, said elements rotatable about horizontal axes, an endless flexible elevating element passing over the first recited elements, and held from swinging movement with respect to the supporting structure by the said rotatable elements, a bed engaging catch adjustably connected with said endless element, and a ratchet device connected with one of said rotatable elements.

4. A portable bed elevator adapted to be placed adjacent one end of a bed, said elevator embodying a supporting structure, spaced sprocket wheels mounted thereon and arranged one above the other to rotate about horizontal axes, a sprocket chain passing over said sprocket wheels, said chain being held against swinging movement with respect to the structure by said sprocket wheels, a ratchet wheel connected with one of the sprockets, a pivotally mounted operating element, a dog connected with said element and coöperating with the ratchet wheel for rotating the sprocket when the said element is actuated, a retaining pawl also coöperating with said ratchet wheel, and a bed engaging device adjustably connected with the sprocket chain.

5. A bed elevator embodying a supporting structure, spaced sprockets mounted thereon and arranged in pairs to rotate about horizontal axes, the sprockets of each pair being spaced laterally and connected to rotate in unison, one pair of sprockets being arranged above the respective sprockets of the other pair, sprocket chains passing over the respective sprockets of the pairs, said chains being held against swinging movement with respect to the structure by said sprockets, a bed engaging catch detachably engaging each of the sprocket chains, a ratchet wheel connected with the connection between the sprocket wheels of one of said pairs of sprockets, a pivotally mounted operating handle, a dog connected with the handle and coöperating with the ratchet wheel to actuate the latter, and a retaining dog also coöperating with the ratchet wheel.

6. A bed elevator embodying a supporting structure, spaced pairs of sprocket wheels mounted thereon to rotate about horizontal axes, one pair of sprockets being arranged above the other pair, sprocket chains passing over the respective sprocket wheels of the pairs, means connecting the sprockets of each pair for adjustment laterally with respect to each other to vary the distance between the sprockets of each pair, a bed engaging device detachably engaging each of the sprocket chains, means operatively connected with the sprocket wheels of one pair for rotating them, and a retaining device connected with one of the pairs of sprockets.

In testimony whereof I have signed my name to this specification, in the presence of two subscribing witnesses, on this 15th day of April, A. D. 1915.

ERNEST MOOS.

Witnesses:
 Mrs. E. Moos,
 F. Millard,